United States Patent

[11] 3,554,086

[72] Inventor Donald F. Wills
Suffield, Conn.
[21] Appl. No. 680,264
[22] Filed Nov. 2, 1967
[45] Patented Jan. 12, 1971
[73] Assignee Chandler Evans Inc.
West Hartford, Conn.
a corporation of Delaware
Continuation of application Ser. No.
500,915, Oct. 22, 1965, now abandoned.

[54] DIGITALLY POSITIONED ACTUATOR
13 Claims, 3 Drawing Figs.
[52] U.S. Cl. .................................................. 91/376,
91/416, 91/417, 91/457, 91/459
[51] Int. Cl. ............................................. F15b 9/10,
F15b 15/17
[50] Field of Search ...................................... 251/131;
91/380(cursory), 363, 363A, 459(cursory),
416(cursory), 457, 417(cursory), 376

[56] References Cited
UNITED STATES PATENTS

| 2,644,427 | 7/1953 | Sedgfield et al. | 251/131 |
| 2,994,305 | 8/1961 | Bruet | 91/380 |
| 3,018,988 | 1/1962 | Ernst et al. | 91/363 |
| 3,124,041 | 3/1964 | McMurtry et al. | 91/363A |
| 3,216,331 | 11/1965 | Kreuter | 91/459 |
| 3,222,996 | 12/1965 | Thieme et al. | 91/457 |
| 3,257,912 | 6/1966 | Vander Horst | 91/416 |
| 3,008,455 | 11/1961 | Ledue | 91/417 |

Primary Examiner—Paul E. Maslousky
Attorney—R. W. Luther

ABSTRACT: Incremental rotary movements of a stepping motor shaft are converted to corresponding linear movements of valve elements which seal against valve seats integral with corresponding power piston affixed to a linear output member. Pressurized fluid moves the piston until sealing engagement with the valve elements occurs; each equal stepping motor shaft movement producing like increments of output member movement regardless of the action of variable external loads on the output member.

INVENTOR.
DONALD F. WILLS
BY
Radford W. Luther
ATTORNEY

INVENTOR.
DONALD F. WILLS
BY Radford W. Luther
ATTORNEY

DIGITALLY POSITIONED ACTUATOR

The application is a continuation of Ser. No. 500,915 filed Oct. 22, 1965 now abandoned.

This invention relates to actuators and more particularly to novel apparatus for positioning a valve or other movable element by means of an actuator including a digital pulse operated positioning device.

Valves or other movable elements for controlling the steps of industrial processes are motivated by power amplifying devices that convert a low level control input signal into an amplified output signal of sufficient power to directly move the valve or other movable element responsive to said input signal. Similarly, control surfaces of high speed aircraft and missiles are moved by power amplifying actuators that convert a low level input signal received from the vehicle guidance system into an amplified output signal of sufficient power to directly move the aircraft or missile control surfaces when such surfaces are subjected to large forces generated by great dynamic pressure and vibration induced in the actuator members by small pressure perturbations in flight.

The present invention was devised to meet the need of both the process control industry and the aeronautical industry for a low cost actuator capable of positioning valves and other movable control elements by means of an amplified input signal in which said input signal as an intermediate step is converted into a variable physical displacement by digital pulse actuated positioning apparatus. The present invention is contemplated for use in a mode of control wherein a digital pulse operated positioning device is operated by a source of low power digital pulse signals in conjunction with an input control signal received from a main control device that generates said input signal in response to a variety of inputs received from a plurality of sensors monitoring selected system parameters. The digital pulse actuated positioning device, responsive to the input control signal, in conjunction with the servo and power amplifying elements regulates the flow of pressurized fluid to the power amplifying portion of the actuator such that there is a fixed physical relationship between each finite position of the digital pulse actuated positioner and the output member of the power amplifying section of the actuator.

Ordinarily, digital pulse actuated positioner devices cannot be directly utilized to satisfactorily control the movable elements of industrial process controls or the control surfaces or aircraft or missiles because of the low output torque and high load inertia of such devices.

Accordingly, one object of this invention is to provide an actuator that amplifies the output of a digital pulse operated input signal responsive positioning device such that each finite position of the digital pulse operated positioning device produces a corresponding fixed position of the actuator output member.

Another object of this invention is to provide a low cost actuator including a digital pulse actuated positioner for precisely moving a process control valve or other movable element; said actuator being of greatly simplified design and construction, and having the characteristic of providing a finite position of the positioner output member for each input pulse and a specific position of the actuator output member for each specific position of the digital pulse actuated positioner output member.

A further object of this invention is to provide a pressurized fluid operated actuator in which the power amplifying apparatus amplifies a position signal received from a digital pulse actuated control input signal responsive positioner such that each discrete location of the digital pulse actuated positioner has a corresponding specific position of the power amplifying output member.

Further objects of my invention are to devise a pressurized fluid operated actuator that embodies the following novel features:

a. Use of a digital pulse actuated positioner having a discrete physical output position for each input pulse whereby said digitally operated positioner moves a servo control element bidirectionally in response to appropriately directed digital input signals such that pressurized fluid is directed to the appropriate side of a force output piston to produce corresponding bidirectional movement thereof, said output piston cooperating with followup mechanism such that said output piston operates to amplify the digital actuated positioner output signal and simultaneously registers a specific position of the output piston in relation to each specific position assumed by the digital actuated positioner; and b. Use of a digital pulse actuated positioner to produce a bidirectional angular position output responsive to a modified analogue input signal device that selectively directionally applies each successive digital pulse to said digital actuated positioner, combined with a valve arrangement operated by the position output signal of said digital actuated positioner such that pressurized fluid is directed to the appropriate side of a force amplifying output piston to displace said output piston such that said output piston registers a specific position in relation to each specific position assumed by the output member of said digital actuated positioner.

Other objects and advantages of the invention will appear in the following description of the respective preferred embodiments thereof shown in the attached drawings in which.

Figure 1:
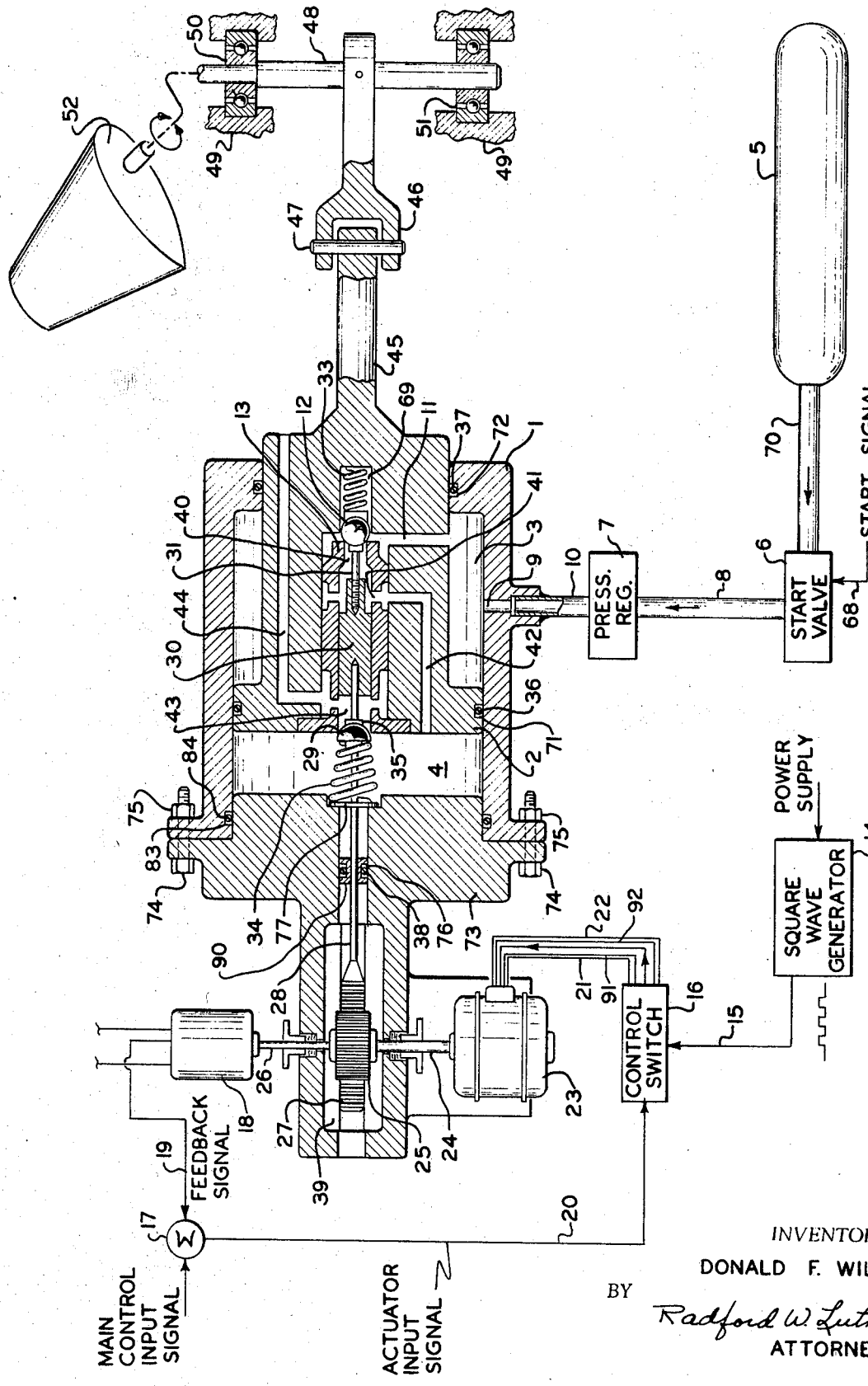
FIG. 1 is an axial sectional view, partially diagrammatic, illustrating one embodiment of the present invention as applied to the actuation of an aerodynamic control surface.

Referring now to the drawings, wherein like characters are used throughout to designate like elements, and more specifically to FIG. 1 wherein is shown a housing 1 having a compartment located therein which contains a piston 2 capable of bidirectional axial movement within said housing. Guide frame 73 is secured to housing 1 by means of bolts 74 and nuts 75. O-ring 83 is positioned in O-ring groove 84 in a manner such that bolts 74, nuts 75 and O-ring 83 combine to provide a fluid tight and fixed relationship between frame 73 and housing 1. The basic bidirectional operation of piston 2 requires the alternate admittance of pressurized fluid into pressurizing chambers 3 and 4. The pressurized operating fluid is stored in tank 5 and is delivered to chamber 3 through start valve 6 via pressure regulating valve 7. The pressurized fluid is carried from tank 5 to start valve 6 in conduit 70, from start valve 6 to pressure regulating valve 7 through conduit 8 and thence from the discharge side of pressure regulating valve 7 to the intake port 9 of pressurizing chamber 3 by means of conduit 10. Pressurized fluid is conveyed from pressurizing chamber 3 to passageway 11 where inlet ball valve 12 in sealing engagement with sleeve 13 prevents the further passage of pressurized fluid until ball valve 12 is disengaged from its seat on sleeve 13.

Square wave generator 14 operated by suitable power supply (not shown) generates a chain of digital electrical pulses that are delivered via signal conduit 15 to control switch 16. It is to be understood that square wave generator 14 is merely representative of a preferred embodiment of pulse generation utilized with the instant digital positioning device. The square wave generator 14 could equally as well be an AC pulse generator producing a sinusoidal output wave form that is processed through a compatible control switch 16 to rotationally control an AC pulse responsive step motor.

A command control signal received from the main or master control (not shown) is summed by summing device 17 with the position feedback signal received from potentiometer 18 via feedback signal conduit 19. The sum of the command control signal and the position feedback signal, called the actuator input signal, is delivered to the control switch 16 via input signal conduit 20. It is to be understood that the feedback modified control input signal delivered to control switch 16 via conduit 20 is merely representative of one form of input signal that can be delivered to control switch 16 via conduit 20. An open loop type of operation in which an unaltered control signal received from the main or master control (not shown) is delivered directly to control switch 16 via conduit 20 is equally applicable. A feedback signal delivered via signal conduit 19 and a feedback summing device 17 are not utilized in the open loop mode of operation.

The rotational direction sense of the input signal communicated to communicated to control switch 16 via signal conduit 20 is established by the level or polarity of the actuator input signal compared to a fixed zero reference. Control switch 16, a type of switching device well known in the art, responsive to the level or polarity of the actuator input signal directs each pulse received from the digital pulse train via signal conduit 15 to signal conduits 21, 22, 91 and 92. The digital pulse actuated positioner 23, commonly called a stepping motor, receives each pulse as transmitted from control switch 16. Using a technique well known in the art, the digital pulses received via conduits 21, 22, 91 and 92 are switched in a four-step sequence to direct excitation of successive elements of the motor windings of step motor 23 to rotate the output shaft 24 in either a clockwise or counterclockwise direction dependent upon the polarity or level of the actuator input signal received by control switch 16 via input signal conduit 20.

Pinion gear 25 is fixedly connected to step motor shaft 24 and to potentiometer shaft 26. Potentiometer shaft 26 is secured to potentiometer 18 such that there is a one to one correspondence in the movement of step motor shaft 24 and potentiometer shaft 26. Pinion gear 25 meshes with rack gear 27 such that each increment of rotary movement of stepping motor shaft 24 results in a corresponding linear movement of rack gear 27. Positioning stem 28 is fixedly connected to rack gear 27. Piston 90, fixedly secured to stem 28, is slideably positioned in its bore in housing 1 and frame 73. A single O-ring 38 positioned in O-ring seal groove 76 located in piston 90 prevents the escape of pressurized fluid from chamber 4 into the atmospheric pressure cavity 39 of guide frame 73.

Positioning stem 28 slideably moves through exhaust valve 29, spring 34, and washer 77. An O-ring seal (not shown) located in an interior bore of exhaust valve 29 and in sliding engagement with positioner stem 28 is constructed to prevent the escape of pressurized fluid from chamber 4 past stem 28 into chamber 43. Positioning stem 28 is fixedly connected to positioning spacer 30. A close tolerance fit prevents the escape of fluid from chamber 40 into chamber 43, or in the alternative an O-ring seal (not shown) can be installed in the outer circumference of sleeve 30 to prevent the escape of pressurized fluid between chamber 40 and chamber 43. Adjusting screw 31 is threadably connected to positioning sleeve 30 and is urged into engagement with inlet valve 12 by inlet valve spring 33. Exhaust valve 29 is urged into sealing engagement with piston sleeve 13 by exhaust valve spring 34. Pin 35 is fixedly connected in a transverse relationship to positioning stem 28 intermediate exhaust valve 29 and positioning sleeve 30. O-ring seal 36 positioned in O-ring seal groove 71 prevents the escape of pressurized fluid between pressurizing chamber 3 and pressurizing chamber 4. Similarly, O-ring seal 37 located in O-ring groove 72 prevents the escape of pressurizing fluid between pressurizing chamber 3 and atmosphere. Pressurized fluid once permitted to pass inlet ball valve 12 proceeds from passageway 11 into chamber 40 of positioning sleeve 13, thence through port 41 into passageway 42 and exhaust into pressurizing chamber 4. Pressurized fluid permitted to pass exhaust valve 29 proceeds to chamber 43 of piston sleeve 13, thence through passageway 44 to atmosphere.

Output member 45, fixedly connected to piston 2, is also secured to bell crank 46 by journal pin 47. Bell crank 46, fixedly secured to control shaft 48, is journaled in housing 49 by bearings 50 and 51 and is also fixedly connected to aerodynamic control surface 52.

Figure 2:
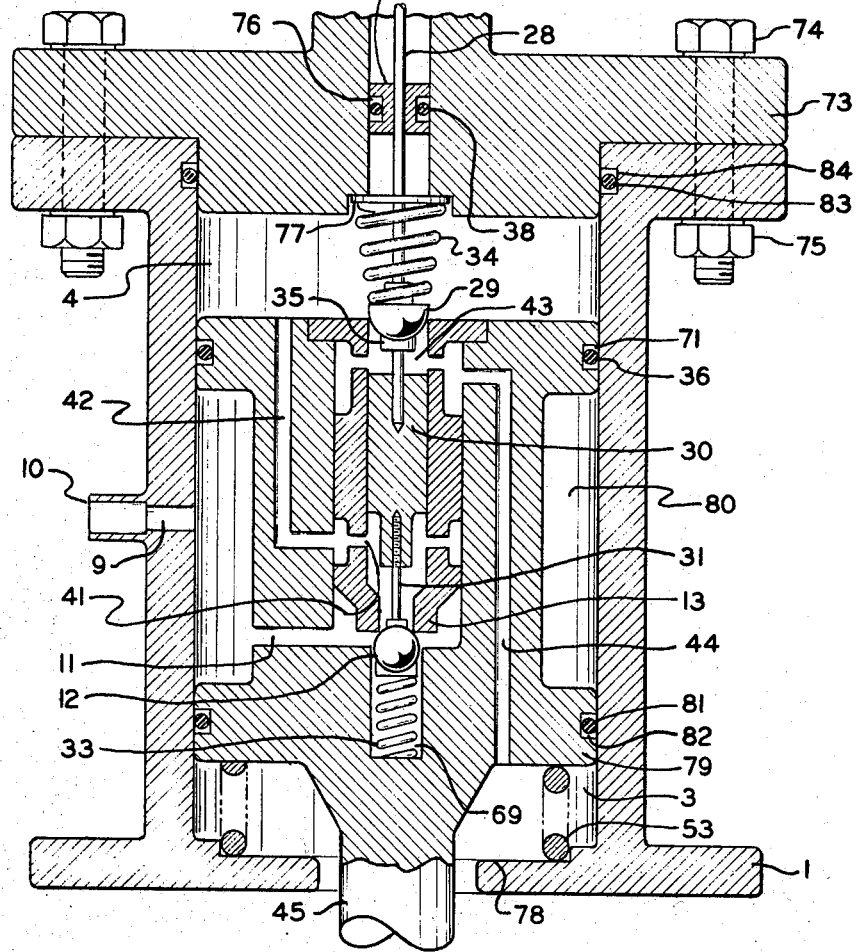
FIG. 2 is a fragmentary axial sectional view of an alternate arrangement of the force output piston elements of the actuator assembly.

Referring now to FIG. 2, an alternate form of actuator piston and output member is shown wherein bias spring 53 is positioned intermediate housing 1 and actuator piston 79. Pressurized fluid enters chamber 80 via inlet port 9 and suitable O-ring seals 36 and 81 located in O-ring grooves 71 and 82 prevent the passage of pressurized fluid from chamber 80 into chambers 3 and 4. Bias spring 53 urges actuator piston 79 in a direction away from the seating flange 78 of bias spring 53 located in housing 1. The force produced by bias spring 53 acting on actuator piston 79 is substantially similar in effect to the force acting on actuator piston 2 as a result of the constant fluid pressure present in pressurizing chamber 3 of the configuration shown in FIG. 1.

Figure 3:
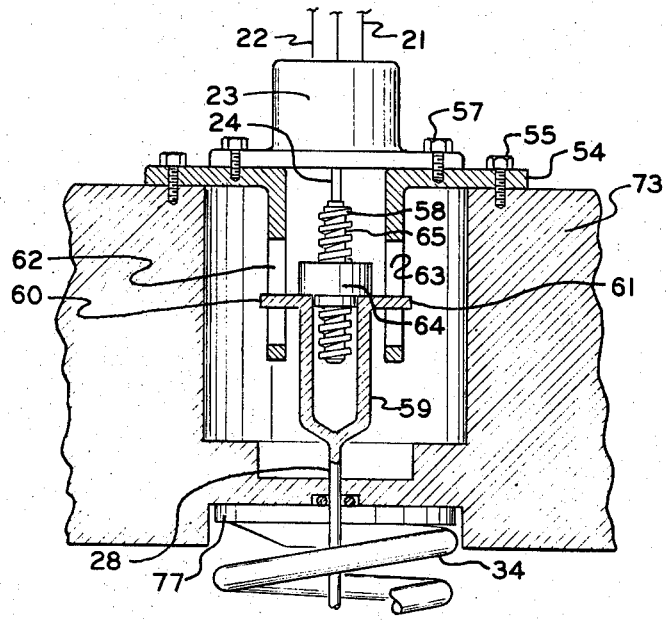
FIG. 3 is a fragmentary axial sectional view of an alternate embodiment to convert the rotary motion of the digital pulse actuated positioner into corresponding linear motion.

Referring now to FIG. 3, an alternate means of converting the bidirectional rotational movement of step motor shaft 24 into corresponding bidirectional linear movement of positioner stem 28 is shown. Stepping motor 23 is fixedly secured to tubular sleeve 54 by cap screws 57. Sleeve 54 is fixedly secured to guide frame 73 by cap screws 55. Ball screw shaft 58 is fixedly secured to step motor shaft 24. Integral with positioner stem 28 is a tubular extension 59 having a pair of oppositely disposed lugs 60 and 61, said lugs positioned within a pair of oppositely disposed slots 62 and 63 such that lugs 60 and 61 reciprocate in slots 62 and 63 while preventing rotation of tubular extension 59 and positioner stem 28. Ball screw nut 64 is fixedly attached to tubular extension 59. Nut 64 is provided internally with a plurality of balls which engage (with rolling friction) in the threads of ball screw shaft 58 to which is fixed the inner race 65 of the ball screw mechanism. This ball screw arrangement is such that rotational movement of stepping motor output shaft 24 and its fixedly connected ball screw shaft 58 produces corresponding linear travel of ball screw nut 64 and tubular extension 59 and positioner stem 28 fixedly attached thereto.

OPERATION

The above-described digital pulse positioned actuator is controlled by a control command signal received from a main control device (not shown). The main control device computes a command output signal responsive to a variety of inputs received from a variety of input sensors. The command output signal information is in the form of an analogue signal that varies in magnitude to establish the "sense" or direction of the control command. Simultaneously, the negative feedback signal produced by potentiometer 18 is fed to summing device 17 where it is summed with the control command signal to produce a resultant control input signal that is communicated to control switch 16. Simultaneously, square wave generator 14 generates a train of uniform digital electrical pulses that are fed to control switch 16 by signal conduit 15. Control switch 16 is a switching device well known in the art, that, responsive to the polarity or level of the control input signal received via signal conduit 20 sequentially directs each digital input pulse to conduits 21, 22, 91 and 92. Each digital pulse is sequenced to stepping motor 23, said stepping motor 23 being so constructed, as is well known in the art, with a plurality of windings such that each digital pulse is sequenced to the plurality of windings of step motor 23 to produce a discrete shaft position of step motor shaft 24 for each successive pulse. The step motor 23 is so constructed that the progressive energization of the plurality of winding in one direction produces an output shaft rotation in one direction while energization of the plurality of winding in the opposite direction produces an opposite shaft rotation. Hence, control switch 16 by appropriate direction of the digital pulses in conduits 21, 22, 91 and 92 can select the direction of rotation of stepping motor 23 and hence its output shaft 24, thus establishing a bidirectional digitally actuated positioning mechanism that produces a discrete positioner output shaft position for each pulse. The sequencing of each digital pulse to the plurality of windings of the step motor by means of control switch 16 to control the direction of rotation of the step motor is called "phasing" of the pulses to produce the motion and control the direction of the step motor. Potentiometer 18 is fixedly connected to stepping motor shaft 24 by means of potentiometer shaft 26, thus potentiometer 18 by use of a three lead center tap arrangement produces a negative position feedback signal referenced to a zero centered position.

Upon the start of operation of an actuator control system to produce motion of the actuator piston 2, as shown in FIG. 1, pressurized fluid from storage bottle 5 is released from bottle 5 by start valve 6. Upon receipt of an appropriate start signal via start signal conduit 68, start valve 6 permits the discharge of pressurized fluid from conduit 70 into conduit 8 connected intermediate start valve 6 and pressure reducing valve 7, and thence into pressure reducing valve 7 where the magnitude of the supply pressure is reduced to the preselected maximum operating pressure. The regulated pressurized fluid enters conduit 10 and thence proceeds directly to pressurized chamber 3 through entrance port 9 and simultaneously proceeds to passageway 11 and chamber 69. The incremental rotary movement of stepping motor output shaft 24 that results from each electrical digital input pulse received by stepping motor 23 is converted into a corresponding linear movement of positioner stem 28 by means of the pinion gear 25 that meshes with rack gear 27, or in the alternative by the ball screw mechanism, as shown in FIG. 3. The linear motion of positioner stem 28 is transmitted to positioner spacer 30 fixedly connected to said positioner stem 28. Adjusting screw 31 is threadably connected to positioner spacer 30 such that linear motion of positioner stem 28 in one direction responsive to a corresponding rotary movement of stepping motor output shaft 24 will unseat inlet ball valve 12 from its fluid tight sealing engagement with piston sleeve 13. This displacement of inlet ball valve 12 will permit regulated pressurized fluid to pass into chamber 40 of piston sleeve 13 and thence through interconnecting port 41 and passageway 42 into pressurizing chamber 4. The area of piston 2 exposed to regulated pressurized fluid in chamber 4 being greater than the area of piston 2 exposed to the same regulated pressurized fluid in pressurizing chamber 3 produces a force differential such that actuator piston 2 and its fixedly connected output member 45, as shown in FIG. 1, axially move in a direction such that a clockwise rotation of control surface 52 results. Exhaust valve 29 is maintained in a fluid tight sealing engagement with piston sleeve 13 by means of exhaust valve spring 34, thus preventing the escape of pressurized fluid from pressurizing chamber 4 when said regulated pressurized fluid is admitted into pressurizing chamber 4 through conduit 42. The movement of actuator piston 2 responsive to the admittance of regulated pressurized fluid in chamber 4 causes valve sleeve 13 to move in unison with said actuator piston 2 such that after a finite axial movement of piston 2 inlet valve 12 will again establish a fluid tight sealing engagement with piston sleeve 13 and thus stop the flow of regulated pressurized fluid into pressurizing chamber 4. Once the flow of pressurized fluid to chamber 4 has been stopped, the movement of actuator piston 2 stops. Hence, a definite fixed positional relationship is established between the digital pulse actuated positioner output shaft 24 and the output member 2. The followup action of actuator piston 2, inlet valve 12 and inlet sleeve 13 in relation to positioner stem 28, and positioner spacer 30 and adjusting screw 31 fixedly secured to stem 28, permits inlet valve 12 to reestablish a fluid tight engagement with piston sleeve 13 after each finite movement of actuator piston 2 resulting from each displacement of inlet valve 12 by adjusting screw 31. This followup action establishes a fixed positional relationship between the displacing means 31 and the actuator piston such that the output member registers a specific position in relation to each specific position assumed by the positioning output shaft 24.

The area of inlet valve 12 exposed to regulated pressurized fluid is quite small in comparison to the total area of actuator piston 2 similarly exposed to said regulated pressurized fluid. Thus, a relatively small force and hence torque output from step motor 23 is required to unseat inlet valve 12. The same regulated pressured fluid acting on the total area of actuator piston 2 exposed to said pressurized fluid in pressurizing chamber 4 results in a relatively large force output in output member 45.

Thus the action of positioner stem 28, and its fixedly connected element positioner spacer 30 and adjusting screw 31 in concert with inlet valve 12, output piston 2 and exhaust valve 29 provide a servomechanism capable of duplicating the positional changes of a low power control actuated positioning element while simultaneously amplifying the force level in the output member.

Similarly, an axial movement of positioner stem 28 in a direction opposite to that first described will cause pin 35 to engage exhaust valve 29 such that exhaust valve 29 is displaced from its sealing engagement with piston sleeve 13 thus permitting regulated pressurized fluid to exhaust to atmosphere from pressurizing chamber 4 via chamber 43 and interconnecting conduit 44. This condition produces a net force unbalance on actuator piston 2 such that actuator piston 2 and its fixedly connected output member 45, as shown in FIG. 1, axially move in a direction such that a counterclockwise movement of control surface 52 results. This axial movement of actuator piston 2 causes exhaust valve 29 to reestablish its sealing engagement with piston sleeve 13 thus preventing the further escape of pressurized fluid from pressurizing chamber 4 after actuator piston 2 has moved a finite discrete axial distance. Thus, output member 45 registers a specific position in relation to each specific position of positioning stem 28 and step motor output shaft 24.

At the start of actuator operation, inlet valve 12 is in sealing engagement with the circumference of the bore of chamber 41 such that the pressurized fluid in conduit 11 exerts a force on inlet valve 12. The magnitude of the force is the product of the pressure level of the pressurizing fluid and the area of the bore in sealing engagement with inlet valve 12. When inlet valve 12 is displaced from its sealing engagement with sleeve 13 by adjustment screw 31, the force generated by inlet valve 12 is transferred to positioner stem 28; simultaneously, pressurized fluid of a reduced magnitude acting on the area of spacer 30 exposed to the pressurized fluid present in chamber 40 produces a resultant force in spacer 30, and an equal but opposite resultant force on exhaust valve 29, which force balances the force on spacer 30. Spring 34 urges positioner stem 28 with a force having a direction opposite to that of the force resulting from the action of the force on valve 12. When stem 28 is moved in a direction to unseat exhaust valve 29, inlet valve 12 will simultaneously form a sealing engagement with sleeve 13 and remove the force acting on positioner stem 28 as a result of the displacement of inlet valve 12, thus the force of spring 34 could create a reversal of force direction on positioner stem 28. This reversal of force direction on positioner stem 28 would cause a backlash error between pinion gear 25 and rack gear 27. To prevent this possible reversal of force direction with its attendant introduction of backlash, piston 90 is secured to positioner stem 28. When pressurized fluid is introduced into chamber 4, the force produced by the pressure differential existing across the two pressurized end faces of piston 90 produces a unidirectional force whose magnitude is sufficiently greater than the vibration induced force of spring 34 to prevent a force reversal from occurring during any portion of the sequential operation of inlet valve 12 and outlet valve 29. The existence of this unidirectional force eliminates the possibility of a backlash between pinion gear 25 and rack gear 27.

The operation of the alternate actuator piston arrangement 79, shown in FIG. 2, is the same as described above except the force on the actuator piston 2 supplied by the pressurized fluid in chamber 3 of FIG. 1 is supplied by bias spring 53 in the arrangement shown in FIG. 2.

The accuracy of positioning the output load member 45 in both the embodiments shown in FIG. 1 and FIG. 2 is determined by the degree of deadband or underlap (opening) for the inlet valve 12 and exhaust valve 35 as set by deadband adjusting screw 31 when positioner stem 28 is stationary.

To illustrate the conditions that may be encountered in a digital pulse position controlled actuator as contemplated herein, the supply bottle 5 may be pressurized to 7,000 p.s.i. The maximum regulated fluid pressure downstream of pressure regulating valve 7 may be 500 p.s.i. The maximum deflection of the control surface may be plus or minus 30° from a zero neutral position, and the deflection per step of the stepping motor may be .3° per step. The output torque at the control shaft 48 shall be at least 1,000 in. lbs., and the stepping rate of the stepping motor shall be 500 steps per sec.

I claim:

1. Actuator apparatus comprising:
   a housing having a compartment located therein;
   digital pulse responsive positioning means;
   control means selectively applying each successive digital pulse to said positioning means to cause incremental rotation in either of two directions of said positioning means;
   fluid operated axially movable actuator means having an actuator piston with a chamber defined therein, said actuator piston being mounted in said compartment;
   means for supplying pressurized fluid to said actuator means;
   means for moving said actuator piston in one axial direction;
   a pair of valves disposed in said actuator piston chamber of said actuator means;
   rigid motion transmission means directly connected to said positioning means and directly operatively adapted to independently position said pair of valves; and
   said rigid motion transmission means responsive to bidirectional motion of said positioning means independently displacing each of said valves to control a flow of operating fluid to said actuator piston to thereby position said actuator piston in the other axial direction and establish an intermediate dead band wherein neither of said pair of valves is open.

2. The apparatus of claim 1 wherein:
   said actuator piston is axially disposed in said compartment and defines first and second chambers;
   said pair of valves is disposed in said actuator piston chamber such that opening one of said valves admits pressurized fluid to said first chamber, and opening the other of said valves exhausts pressurized fluid from said first chamber; and wherein there is further provided,
   follower means comprising said actuator piston, said pair of valves and said rigid motion transmission means constructed and arranged to produce a finite axial movement of said actuator piston responsive each displacement of said motion transmission means.

3. Actuator apparatus in accordance with claim 2 in which said positioning means includes a stepping motor and a rack and pinion gear assembly.

4. Actuator apparatus in accordance with claim 3 in which said control means includes:
   means for generating a feedback signal commensurate with the actual position of the stepping motor output shaft;
   means summing said actual position feedback signal and an input signal to generate a resultant control input signal; and
   means phasing said digital pulses to said positioning means responsive to said resultant control input signal.

5. Actuator apparatus in accordance with claim 2 in which said positioning means includes a stepping motor and a ball and screw assembly.

6. Actuator apparatus in accordance with claim 5 in which said control means includes:
   means for generating a feedback signal commensurate with the actual position of the stepping motor output shaft;
   means summing said actual position feedback signal and an input signal to generate a resultant control input signal; and
   means phasing said digital pulses responsive to said resultant control input signal.

7. A power actuator device having an output member comprising:
   a source of pressurized fluid;
   positioning means having a discrete rotational movement in response to each received electrical pulse;
   control means selectively positioning each successive electrical pulse in response to a control input signal to rotate said positioning means in either of two directions;
   actuator means including an actuator piston fixedly secured to said output member;
   an axially movable rigid member connected to said positioning means and operably attached to flow control means, including a plurality of valve means, positioned in said actuator means to thereby direct said flow of pressurized fluid to said actuator piston and to effect an adjustable dead band in said flow control means whereby said plurality of valve means are simultaneously closed; and
   followup means including said actuator piston acting in concert with said rigid member to control the flow of pressurized fluid to said actuator means independent of an acceleration force environment and thus position said followup means such that each incremental rotary position of said positioning means produces a corresponding incremental linear position of said output means.

8. A power actuator device in accordance with claim 7 in which said positioning means includes a stepping motor and a rack and pinion gear assembly.

9. Actuator apparatus in accordance with claim 8 in which said control means includes:
   means for generating a feedback signal commensurate with the actual position of the stepping motor output shaft;
   means summing said actual position feedback signal and an input signal to generate a resultant control input signal; and
   means phasing said digital pulses responsive to said resultant control input signal.

10. A power actuator device in accordance with claim 7 in which said positioning means includes a stepping motor and a ball and screw assembly.

11. Actuator apparatus in accordance with claim 10 in which said control means includes:
   means for generating a feedback signal commensurate with the actual position of the stepping motor output shaft;
   means summing said actual position feedback signal and an input signal to generate a resultant control input signal; and
   means phasing said digital pulses responsive to said resultant control input signal.

12. Actuator apparatus operated in a substantial acceleration or vibratory induced field comprising in combination:
   a linearly movable output member;
   a source of pressurized fluid;
   digital pulse actuated bidirectional rotary positioning means;
   control means selectively directionally applying each successive digital pulse to said rotary positioning means to cause incremental rotation in either of two directions of said positioning means;
   actuator means including a pressurized fluid operated actuator piston having a chamber located therein, said chamber including means controlling the flow of said pressurized fluid to said actuator piston;
   said actuator piston fixedly connected to said output member, a rigid linear motion transmission member connected to said positioning means and said flow control means such that for each incremental bidirectional rotary movement of said positioning means a corresponding incremental linear movement of said motion transmission member is produced; and
   said flow control means having separate inlet and exhaust valves so constructed and arranged that said valves are independently linearly positioned by said member to control the flow of said pressurized fluid to said actuator means such that, unaffected by vibratory or acceleration generated forces, a finite position of said linearly movable output member is registered for each finite rotary position of said positioning means, and a dead band is established wherein both said inlet and said exhaust valves are closed.

13. A power actuator in accordance with claim 12 in which said flow control means comprises:

a first fluid supply passage located in said actuator piston, said inlet valve positioned intermediate said first passage such that pressurized fluid is delivered to a first side of said actuator piston responsive to the opening of said inlet valve; and a second fluid passage located in said actuator piston with said exhaust valve positioned therein such that pressurized fluid is exhausted from said first side of said actuator piston responsive to the opening of said exhaust valve.